Oct. 7, 1958  S. SCHILLER  2,855,002
DIAPHRAGM

Filed June 1, 1955  2 Sheets-Sheet 1

FIG. I

INVENTOR
Sigge Schiller
BY
Pennie, Edmonds, Morton, Barrows & Taylor
ATTORNEYS

Oct. 7, 1958    S. SCHILLER    2,855,002
DIAPHRAGM

Filed June 1, 1955    2 Sheets-Sheet 2

INVENTOR
Sigge Schiller
BY
ATTORNEYS

United States Patent Office 2,855,002
Patented Oct. 7, 1958

2,855,002

DIAPHRAGM

Sigge Schiller, Rutherford, N. J., assignor to Leslie Co., Lyndhurst, N. J., a corporation of New Jersey Application June 1, 1955, Serial No. 512,513

3 Claims. (Cl. 137—793)

This invention relates to diaphragms and more particularly to a flexible, metal diaphragm.

In the use of metal diaphragms, it is recognized that considerable energy is required to stretch the diaphragm beyond its natural position or to reverse its motion back through and beyond its natural position. As a result, the sensitivity of instruments in which such diaphragms are used has been limited. This led to the use of diaphragms formed of rubber or rubber-like elastomers which require less energy to obtain travel of the diaphragm or to make it go through its natural position. But the use of such materials is not possible in installations where high temperatures are encountered.

Some of the short-comings of a flat metal diaphragm may be overcome by corrugating the diaphragm to produce annular convolutions. But such convolutions, while increasing the flexibility of the diaphragm across its diameter, have a tendency to make it less flexible circumferentially. And it will be readily apparent that if a diaphragm is to have a reasonable amount of travel in both directions, from and through its natural position, it is necessary that it be able to increase, or decrease, its circumference as well as its diameter.

In the present invention I provide a metal diaphragm constructed to work on both sides of a neutral line or plane, which has a minimum of spring tension, and which can be expanded or compressed either radially or circumferentially, with a minimum of effort. In carrying out the invention, I employ a metal disc of proper size and thickness, and form a number of shallow dents in the surface of the disc. The dents may be in various designs or patterns, several of which are illustrated in the accompanying drawings. They are shaped or arranged to permit either stretching or compressing as the diaphragm travels in both radial and circumferential directions without stiffening the diaphragm or appreciably increasing its spring tension.

In the accompanying drawings, I have shown several embodiments of the invention. In this showing:

Figure 2:
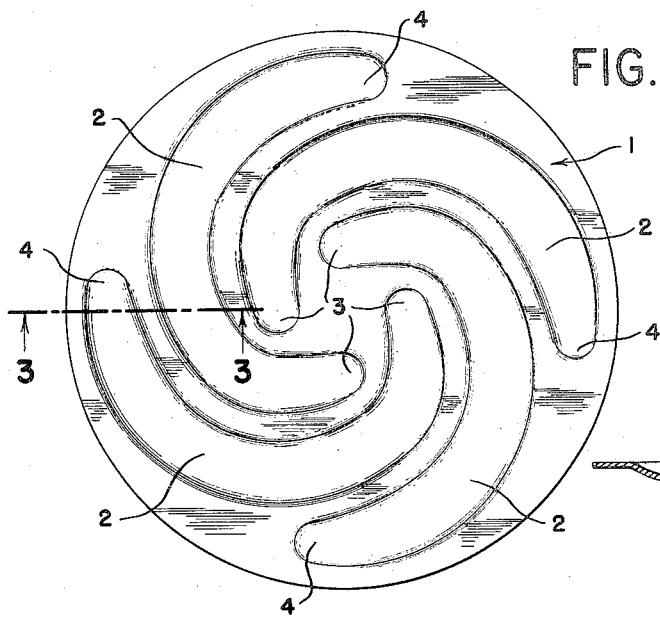
Fig. 2 is a plan view of one form of diaphragm constructed in accordance with the present invention.
Figure 3:
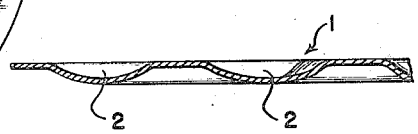
Fig. 3 is a detailed, sectional view on line 3—3 of Fig. 2.

Referring to Figs. 2 and 3 of the drawings, the reference numeral 1 designates generally a thin, metal diaphragm which, as illustrated, is generally circular in shape to be supported around its edge in a diaphragm casing as hereinafter disclosed. The diaphragm is provided with a series of relatively shallow depressions 2 (see Fig. 2), which are spirally arranged, that is, each starts at a point 3 near the center of the diaphragm and extends in a substantial half-circle to a point 4 adjacent the outer edge. I have found that a series of spiral dents or depressions so arranged provide material for, and permit, either expansion or compression of the metal of the diaphragm as the diaphragm travels from one side to the other of a neutral line or plane. This provides greater flexibility than has heretofore been obtainable in metal diaphragms and permits the diaphragm to be operated by less power. Thus, a more sensitive metal diaphragm is obtained, which is capable of use at high temperatures.

Figure 4:
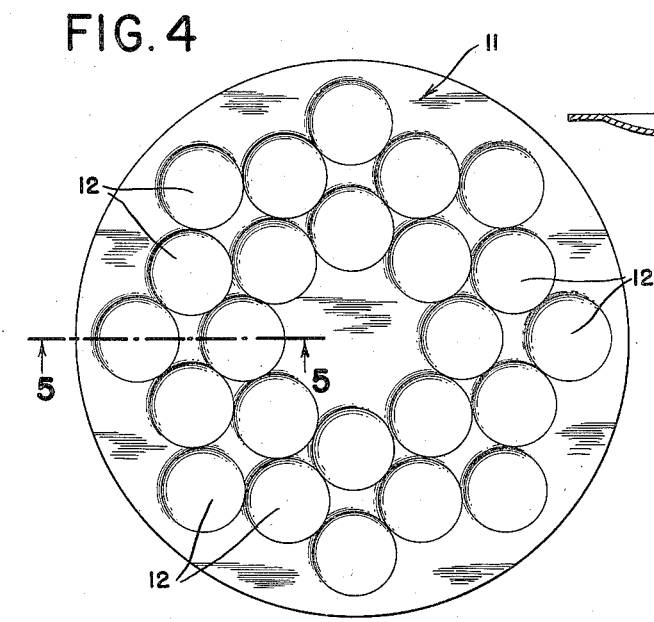
Fig. 4 is a plan view of another form of diaphragm constructed in accordance with the present invention.
Figure 5:
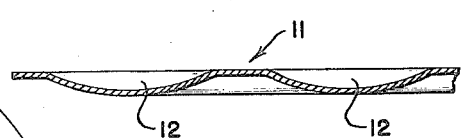
Fig. 5 is a detailed, sectional view on line 5—5 Fig. 4.

The provision of metal to permit the diaphragm to stretch or be compressed both radially and circumferentially when passing through the neutral plane or line may be produced in many ways. In Figs. 4 and 5 I have illustrated a diaphragm 11 formed of thin metal and having a plurality of substantially circular deformations or dents 12 in its surface. A diaphragm so constructed also provides metal which permits it to be stretched or compressed both radially and circumferentially and, therefore, permits large travel without the application of an undue amount of energy to the diaphragm.

Figure 1:
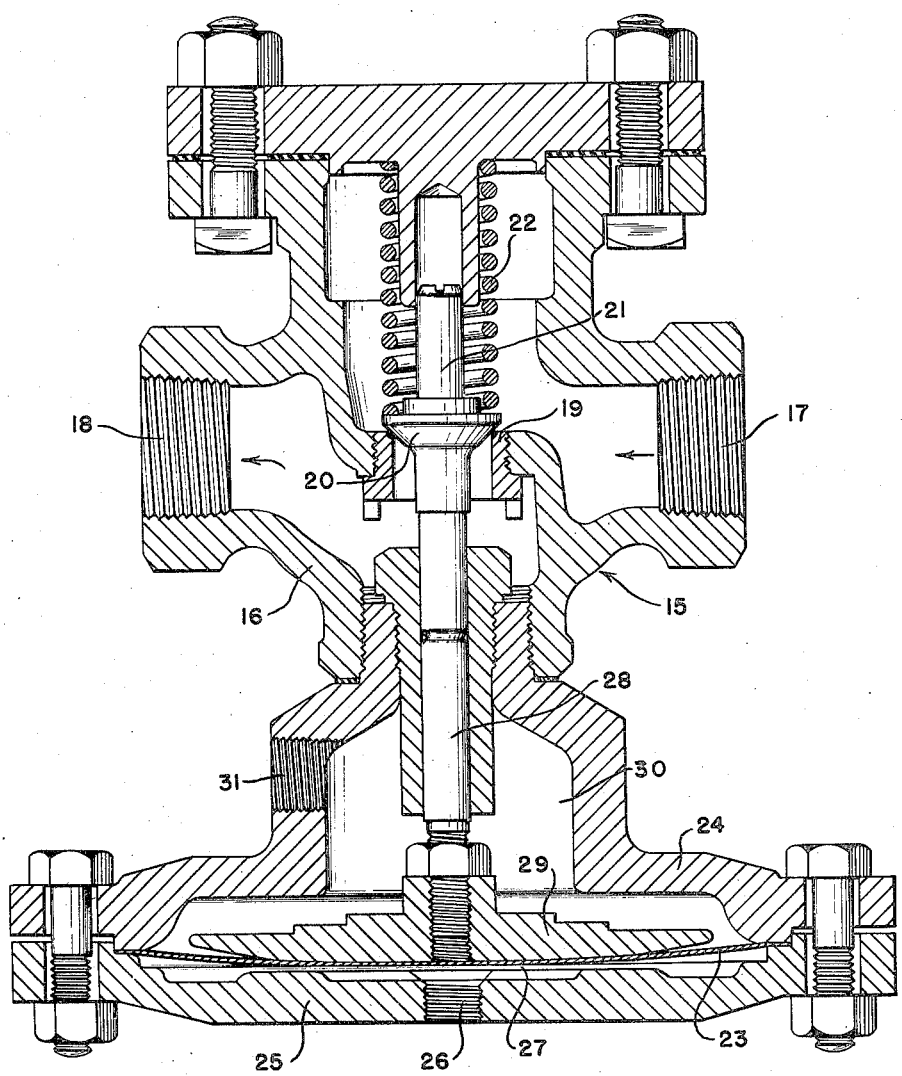
Fig. 1 is a vertical, sectional view of a valve assembly of which the diaphragm forms a part.

Such diaphragms are employed in diaphragm chambers where they are supported at their periphery and where an engaging or contacting member of appreciable area engages the diaphragm near the center. Thus, in Fig. 1 I have shown a pressure-reducing valve 15 consisting of a valve casing 16 having an inlet 17 and an outlet 18. A valve seat 19 is arranged in the casing and it cooperates with a valve 20 above the valve seat. Valve stem 21 is surrounded by a spring 22 biasing the valve toward a closed position. Diaphragm 23 is mounted in a diaphragm casing 24 below the valve. This casing is provided with a cap 25 and, as shown, the diaphragm edge is clamped between the casing and the cap. The cap is provided with an inlet opening communicating with the diaphragm chamber 27. Inlet opening 26 is connected by suitable means (not shown) to a source of pressure.

Valve stem 28 extends below valve 20 into the diaphragm casing and has a head or follower 29 secured to its lower end. This head is of appreciable size and engages diaphragm 23 over the greater portion of its area, as shown. The system, beyond the valve, is connected to a diaphragm chamber 30 through opening 31. Clearance around valve stem 28 also establishes communication between the outlet side of the valve casing and diaphragm chamber 30. When the pressure in chamber 27 overcomes the spring load and the force of the inlet pressure acting on valve 20, the valve is opened. Pressure is admitted from the inlet to the downstream side, as the downstream pressure builds up, the pressure is felt on the underside of the diaphragm which tends to close the valve until it establishes a force balance between the air pressure applied to one side of the diaphragm, and the reduced pressure working on the underside of the diaphragm plus the valve spring force plus the unbalanced force of the inlet pressure over the valve seating area. In operation, the diaphragm travels through the neutral zone, for example, from the position shown to a condition where it is flexed upwardly. It will be apparent that with this amount of travel the flat, metal diaphragm would be compressed and stretched both radially and circumferentially. It would require considerable energy to stretch the diaphragm in this manner and reverse its motion as it travels through the neutral position. But by providing a sheet that may stretch or be compressed, both radially and circumferentially without stiffening the diaphragm, I provide a construction that can be operated with a small amount of energy, and which may therefore have high sensitivity.

With a construction as illustrated, it is necessary for the diaphragm to again travel through the neutral plane when the pressure in the diaphragm chamber falls below the force exerted by spring 22. The ability of the metal to do this without a material increase in spring tension permits the use of a weaker spring than would otherwise be necessary and this provides for greater sensitivity.

The dents or deformations in the material of the diaphragm should be relatively shallow. As the conditions will vary with changes in the size of the diaphragm, its thickness and other factors, I can best state the depth of dents to employ by pointing out that if they are too deep, a hysteresis effect will be produced when the diaphragm travels from one side of the neutral line or plane to the other. While a slight hysteresis is not too objectionable in some cases, it should be avoided when sensitiveness of operation is required.

I claim:

1. A diaphragm comprising a metal disc adapted to be supported throughout its periphery, the center of the diaphragm being movable in a direction substantially normal to the faces thereof, the diaphragm being provided with a plurality of symmetrically arranged eccentrically disposed curved walled depressions intermediate the peripheral and central areas of said disc, all of said depressions projecting in one direction from one face of said disc and the remaining portion of said disc lying in a plane which contains the peripheral edge, the said central area being of a dimension greater than the mean width of said depressions, the said depressions providing excess metal to permit movement of the central area of the diaphragm in either direction, and expansion and contraction of metal in both annular and radial directions and provide excess metal to permit such movements without stretching the metal of the diaphragm, the said depressions being of greatest depth when the diaphragm is flat and being of substantially zero depth when the central area of the diaphragm has moved to its limit of movement in either direction.

2. A diaphragm in accordance with claim 1 in which the said depressions extend spirally of the face of the diaphragm.

3. A diaphragm in accordance with claim 2 in which the said depressions are circular in plan and cover a substantial portion of the face of the disc.

References Cited in the file of this patent

UNITED STATES PATENTS

| 56,135 | Wilson | July 3, 1866 |
| 56,694 | Blake | July 31, 1866 |
| 116,669 | Blake | July 4, 1871 |
| 128,452 | Anderson | July 2, 1872 |
| 508,133 | Gold | Nov. 7, 1893 |
| 1,437,728 | Veneria | Dec. 5, 1922 |